(12) United States Patent
Tanaka et al.

(10) Patent No.: US 7,825,531 B2
(45) Date of Patent: Nov. 2, 2010

(54) HYDRAULIC POWER GENERATING DEVICE AND MANUFACTURING METHOD THEREFOR

(75) Inventors: Shogo Tanaka, Nagano (JP); Yukinobu Yumita, Nagano (JP); Hideaki Ito, Nagano (JP); Shinichi Yoshikawa, Nagano (JP)

(73) Assignee: Nidec Sankyo Corporation (JP)

( * ) Notice: Subject to any disclaimer, the term of this patent is extended or adjusted under 35 U.S.C. 154(b) by 501 days.

(21) Appl. No.: 11/728,759

(22) Filed: Mar. 27, 2007

(65) Prior Publication Data

US 2007/0246941 A1 Oct. 25, 2007

(30) Foreign Application Priority Data

Mar. 27, 2006 (JP) ............................. 2006-085749
Mar. 27, 2006 (JP) ............................. 2006-085750

(51) Int. Cl.
*F03B 13/00* (2006.01)
*H02P 9/04* (2006.01)
(52) U.S. Cl. ......................................... 290/54; 290/43
(58) Field of Classification Search .................. 290/43, 290/54, 1 R; 60/398, 325, 671
See application file for complete search history.

(56) References Cited

U.S. PATENT DOCUMENTS

| | | | |
|---|---|---|---|
| 3,776,265 A * | 12/1973 | O'Connor, Jr. ............ | 137/487.5 |
| 4,731,545 A * | 3/1988 | Lerner et al. .................. | 290/54 |
| 6,036,333 A * | 3/2000 | Spiller ......................... | 362/192 |
| 6,559,553 B2 * | 5/2003 | Yumita et al. ................. | 290/54 |
| 7,112,892 B2 * | 9/2006 | Mahowald .................... | 290/54 |
| 7,253,536 B2 * | 8/2007 | Fujimoto et al. ............. | 290/43 |
| 2003/0127861 A1 * | 7/2003 | Yumita et al. ................ | 290/43 |
| 2005/0006903 A1 * | 1/2005 | Yumita et al. ................ | 290/43 |
| 2008/0217923 A1 * | 9/2008 | Yen ............................. | 290/54 |
| 2008/0231056 A1 * | 9/2008 | Wen ............................ | 290/54 |
| 2008/0246282 A1 * | 10/2008 | Hathaway et al. ............ | 290/54 |

FOREIGN PATENT DOCUMENTS

JP  2003129930 A  *  5/2003
JP  2004-340111  12/2004

* cited by examiner

*Primary Examiner*—Julio C. Gonzalez
(74) *Attorney, Agent, or Firm*—Cantor Colburn LLP

(57) ABSTRACT

A hydraulic power generating device may include a power generating hydraulic turbine having a plurality of first blades projected on an outer peripheral side and a cylindrical plate part which may be coaxially structured with a rotating center axial line of the power generating hydraulic turbine at a position adjacent in an axial direction to the first blades, and an ejection port for ejecting water may be opened both to the first blade and to the cylindrical plate part. Further, hydraulic power generating device may include a power generating hydraulic turbine having a hollow cylindrical body, a first cylindrical radial bearing and a second cylindrical radial bearing. The second radial bearing may be positioned at a second end part of the hollow cylindrical body with a shaft hole of the first radial bearing as the reference.

5 Claims, 3 Drawing Sheets

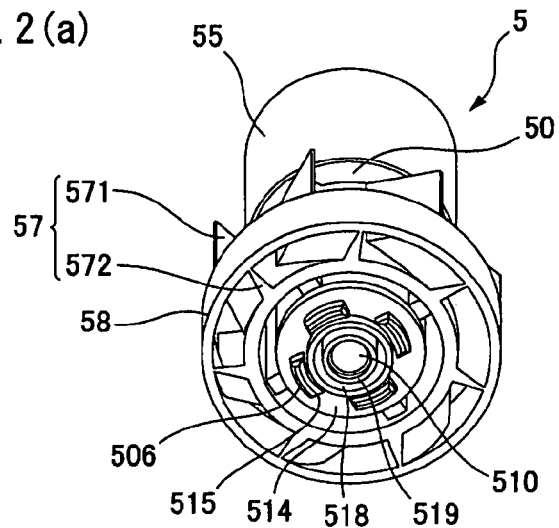
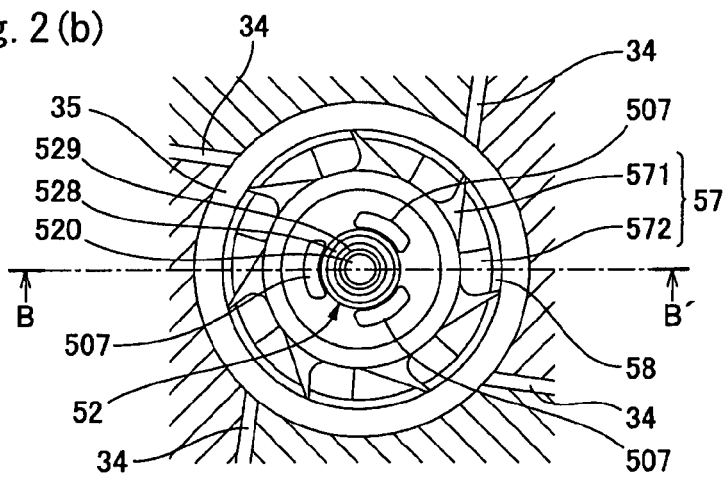
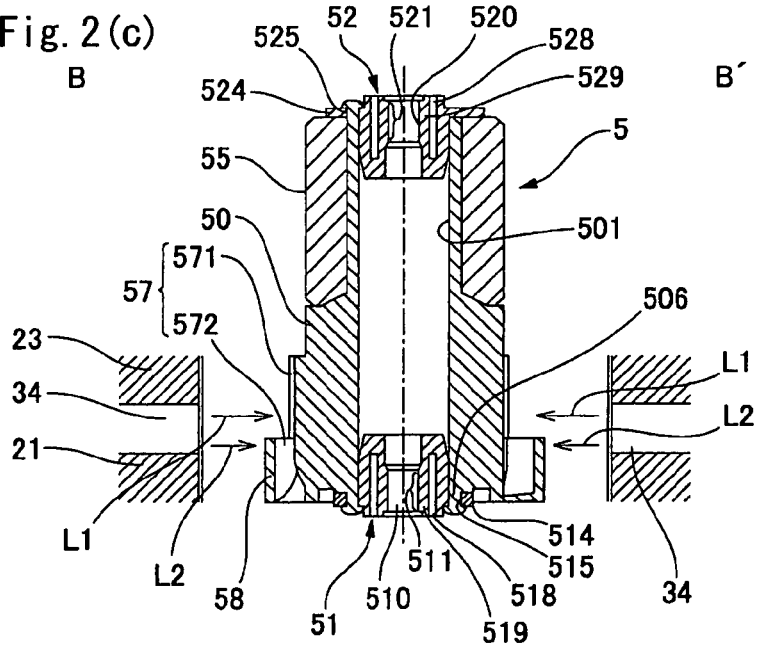

HYDRAULIC POWER GENERATING DEVICE AND MANUFACTURING METHOD THEREFOR

CROSS REFERENCE TO RELATED APPLICATION

The present invention claims priority under 35 U.S.C. §119 to Japanese Application No. 2006-85749 filed Mar. 27, 2006, and Japanese Application No. 2006-85750 filed Mar. 27, 2006, both of which are incorporated herein by reference.

FIELD OF THE INVENTION

An embodiment of the present invention may relate to a hydraulic power generating device for generating electricity by utilizing tap water or the like and a manufacturing method for the hydraulic power generating device.

BACKGROUND OF THE INVENTION

An automatic faucet device has been known which is structured such that, when hands are extended under a faucet, a sensor senses them and water is made to flow from a faucet automatically. Further, in recent years, an automatic faucet device has been known in which a small hydraulic power generating device is arranged at a middle position of a flow path of tap water and electric power obtained by the hydraulic power generating device is stored to supply the electric power to a sensor circuit or the like of the automatic faucet device.

The hydraulic power generating device includes a case which structures a flow path from a fluid inlet to a fluid outlet, a support shaft which is disposed at a middle position of the flow path, and a cylindrical power generating hydraulic turbine which is rotatably supported by the support shaft. A conventional power generating hydraulic turbine is provided with a cylindrical part, blades which are projected from an outer peripheral face of the cylindrical part, and radial bearings having a shaft hole through which a support shaft is penetrated, and the radial bearings are integrally formed with the cylindrical part by resin molding (see, for example, Japanese Patent Laid-Open No. 2004-340111).

In the hydraulic power generating device as described above, there is commonly a clearance between the shaft hole of the power generating hydraulic turbine and the support shaft. Further, since the power generating hydraulic turbine is rotated by water which is ejected from an ejection port to be hit to the blade of the power generating hydraulic turbine, a positional relationship between the blade and the ejection port varies with rotation of the power generating hydraulic turbine and thus a direction of a force that is applied to the power generating hydraulic turbine varies. As a result, when the power generating hydraulic turbine is rotated, rotational vibration or rotation noise may occur.

When the power generating hydraulic turbine is integrally resin-molded with radial bearings, a high degree of accuracy is not attained in a dimension of an inner diameter of the shaft hole of the radial bearing due to influences of shrinkage or the like, and thus rotation noise may occur when the power generating hydraulic turbine is rotated. Further, when the radial bearings are integrally resin-molded at both ends of the cylindrical part on which the blades are projected from its outer peripheral face, dispersion may occur in size of the shaft holes of respective radial bearings due to influence of shrinkage or the like. In this state, concentric positions of the shaft holes of the respective radial bearings cannot be obtained. Therefore, a large clearance is required to be provided between the shaft hole of the radial bearing and the support shaft. However, when such a large clearance is provided, rotation noise may occur when the power generating hydraulic turbine is rotated.

SUMMARY OF THE INVENTION

In view of the problems described above, an embodiment of the present invention may advantageously provide a hydraulic power generating device which is capable of preventing occurrence of rotational vibration and rotation noise when a power generating hydraulic turbine is rotated. Further, in view of the problems described above, another embodiment of the present invention may advantageously provide a hydraulic power generating device and its manufacturing method in which a pair of shaft holes of radial bearings provided in a power generating hydraulic turbine can be surely positioned concentrically with each other.

Thus, according to an embodiment of the present invention, there may be provided a hydraulic power generating device including a flow path which is formed from a fluid inlet to a fluid outlet, a power generating hydraulic turbine which is disposed at a middle position of the flow path in an axially rotatable manner, and at least an ejection port which ejects water to the power generating hydraulic turbine. The power generating hydraulic turbine includes a plurality of first blades which is projected on an outer peripheral side, and a cylindrical plate part which is coaxially structured with a rotating center axial line of the power generating hydraulic turbine at a position adjacent in an axial direction to the first blades, and the ejection port is opened both to the first blade and to the cylindrical plate part.

In the power generating hydraulic turbine used in the hydraulic power generating device in accordance with an embodiment of the present invention, a cylindrical plate part is provided at a position adjacent in an axial direction to a first blade, and an ejection port is opened toward a direction to both the first blade and the cylindrical plate part. Therefore, while a part of water which is ejected from the ejection port directly hits the first blade, a remaining part of the water ejected from the ejection port hits an outer face of the cylindrical plate part all the time. Therefore, pressure of the water which hits the cylindrical plate part gives a centering operation to the power generating hydraulic turbine and thus rotational vibration and rotation noise which occur when the power generating hydraulic turbine is rotated can be prevented.

In accordance with an embodiment, the power generating hydraulic turbine includes a plurality of second blades which is projected on an outer peripheral side and which is disposed adjacent to the first blades in the axial direction, and the cylindrical plate part connects outer tip ends of the second blades with each other. According to the structure described above, water directly hits the first blade and then flows through the inside of the cylindrical plate part and, in this case, the water also efficiently hits the second blade. Therefore, since the power generating hydraulic turbine is efficiently rotated, power generation efficiency of the hydraulic power generating device is improved.

In accordance with an embodiment, a radial distance of an outer peripheral face of the cylindrical plate part is the same as that of an outer tip end of the first blade. According to the structure described above, water which has directly hit the first blade can be efficiently flowed into the inside of the cylindrical plate part.

In accordance with an embodiment, the ejection port comprises a plurality of ejection ports, and timings of the first blades which are respectively approached to the closest position to the ejection ports are different from each other. For example, when a plurality of the first blades is disposed with an equal angular interval and a plurality of the ejection ports is formed with an equal angular interval, the number of the first blades and the number of the ejection ports may be set in relation prime to each other. In other words, the number of the ejection ports and the number of the first blades are set in a condition that one is not equal to an integer multiple of the other. According to the structure described above, waters which are ejected from the ejection ports are prevented from hitting simultaneously two or more blades intensely and thus large forces are prevented from being applied simultaneously to the power generating hydraulic turbine. Accordingly, rotational vibration and rotation noise which occur when the power generating hydraulic turbine is rotated can be surely prevented.

Further, according to another embodiment of the present invention, there may be provided a hydraulic power generating device including a flow path which is formed from a fluid inlet to a fluid outlet, a support shaft which is disposed at a middle position of the flow path, and a power generating hydraulic turbine which is rotatably supported with the support shaft. The power generating hydraulic turbine includes a hollow cylindrical body which is provided with a through hole, at least a blade which is projected from an outer peripheral face of the hollow cylindrical body, a first cylindrical radial bearing which is separately structured from the hollow cylindrical body, and is formed with a shaft hole through which the support shaft is penetrated, and is fixed to a first end part of the through hole of the hollow cylindrical body, and a second cylindrical radial bearing which is separately structured from the hollow cylindrical body, and is formed with a shaft hole through which the support shaft is penetrated, and is fixed to a second end part of the through hole of the hollow cylindrical body.

In accordance with the embodiment of the present invention, the power generating hydraulic turbine is so structured that the hollow cylindrical body, which is provided with the blades projected from its outer peripheral face, the first radial bearing and the second radial bearing are formed to be separated from each other. Therefore, even when the hollow cylindrical body, the first radial bearing and the second radial bearing are respectively structured of a resin molded product, shrinkage or the like is not easily occurred. Accordingly, the first radial bearing and the second radial bearing can be manufactured by resin molding so that both their shaft holes are formed with a high degree of dimensional accuracy. Further, after the first radial bearing has been fixed to the hollow cylindrical body, the second radial bearing is positioned with the shaft hole of the first radial bearing as the reference and thus the first radial bearing and the second radial bearing can be concentrically arranged. Accordingly, rotational vibration and rotation noise which occur when the power generating hydraulic turbine is rotated can be surely prevented. Further, the first radial bearing and the second radial bearing may be formed of abrasion resistance material and the hollow cylindrical body may be formed of inexpensive material or material suitable for reducing weight. Therefore, even when the radial bearing is structured of abrasion resistance material, manufacturing cost can be restrained.

In accordance with an embodiment, at least one of the first radial bearing and the second radial bearing is made of resin, and the radial bearing made of resin is formed with a circumferential groove which is recessed in an axial direction so as to surround the shaft hole, and a cylindrical wall is formed between the shaft hole and the circumferential groove. According to the structure described above, when the radial bearing is produced by resin molding, shrinkage in an inner peripheral face of the radial bearing can be prevented. Therefore, when a radial bearing made of resin is produced, dimension of a diameter of the shaft hole is formed with a high degree of accuracy. Further, even when the resin radial bearing is press-fitted or welded to the through hole of the hollow cylindrical body, its deformation does not affect the shaft hole.

In this embodiment, it is preferable that an entire slide portion of the radial bearing with the support shaft is structured with the cylindrical wall.

In accordance with an embodiment, a clearance between an inner peripheral face in the second end part of the through-hole and an outer peripheral face of the second radial bearing is set to be larger than a clearance between an inner peripheral face in the first end part of the through-hole and an outer peripheral face of the first radial bearing. According to the structure described above, since the clearance between the inner peripheral face of the through-hole and the outer peripheral face of the first radial bearing is set to be small, the first radial bearing can be press-fitted into the through hole. Further, since the clearance between the inner peripheral face of the through-hole and the outer peripheral face of the second radial bearing is set to be larger, when the second radial bearing is going to be positioned with the shaft hole of the first radial bearing as the reference, a problem where the second radial bearing abuts with the through hole to hinder centering can be prevented.

Further, according to another embodiment of the present invention, there may be provided a manufacturing method for a hydraulic power generating device having a flow path which is formed from a fluid inlet to a fluid outlet, a support shaft which is disposed at a middle position of the flow path, and a power generating hydraulic turbine which is rotatably supported with the support shaft. The manufacturing method includes providing a power generating hydraulic turbine comprising a hollow cylindrical body having a through hole and at least a blade which is projected from an outer peripheral face of the hollow cylindrical body, providing a first cylindrical radial bearing which is separately structured from the hollow cylindrical body and is formed with a shaft hole through which the support shaft is to be penetrated, providing a second cylindrical radial bearing which is separately structured from the hollow cylindrical body and is formed with a shaft hole through which the support shaft is to be penetrated, performing a first radial bearing fixing step in which the first radial bearing is fixed to a first end part of the through hole of the hollow cylindrical body of the power generating hydraulic turbine, after that, performing a centering step in which the second radial bearing is positioned at a second end part of the through hole of the hollow cylindrical body with the shaft hole of the first radial bearing as a reference, after that, performing a second radial bearing fixing step in which the second radial bearing is fixed to the second end part of the through hole of the hollow cylindrical body of the power generating hydraulic turbine, and after that, fitting the power generating hydraulic turbine to the support shaft so as to be rotatably supported by the support shaft.

In accordance with an embodiment, in the centering step, a positioning shaft is fitted into the shaft hole of the first radial bearing which is fixed to the first end part of the through hole of the hollow cylindrical body of the power generating hydraulic turbine and, after that, the positioning shaft is fitted into the shaft hole of the second radial bearing and, after that, the second radial bearing is positioned at the second end part of the through hole of the hollow cylindrical body. According to the manufacturing method described above, positioning of the second radial bearing can be easily and surely performed with the shaft hole of the first radial bearing as the reference.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2(a) is a perspective view showing a power generating hydraulic turbine which is used in the hydraulic power generating device shown in FIGS. 1(a) and 1(b), viewed from a first radial bearing side. FIG. 2(b) is an explanatory plan view showing the power generating hydraulic turbine viewed from a second radial bearing side, and FIG. 2(c) is its B-B' cross-sectional view.

DETAILED DESCRIPTION OF THE PREFERRED EMBODIMENTS

A hydraulic power generating device and a manufacturing method for the hydraulic power generating device in accordance with an embodiment of the present invention will be described below with reference to the accompanying drawings.

Figure 1A:
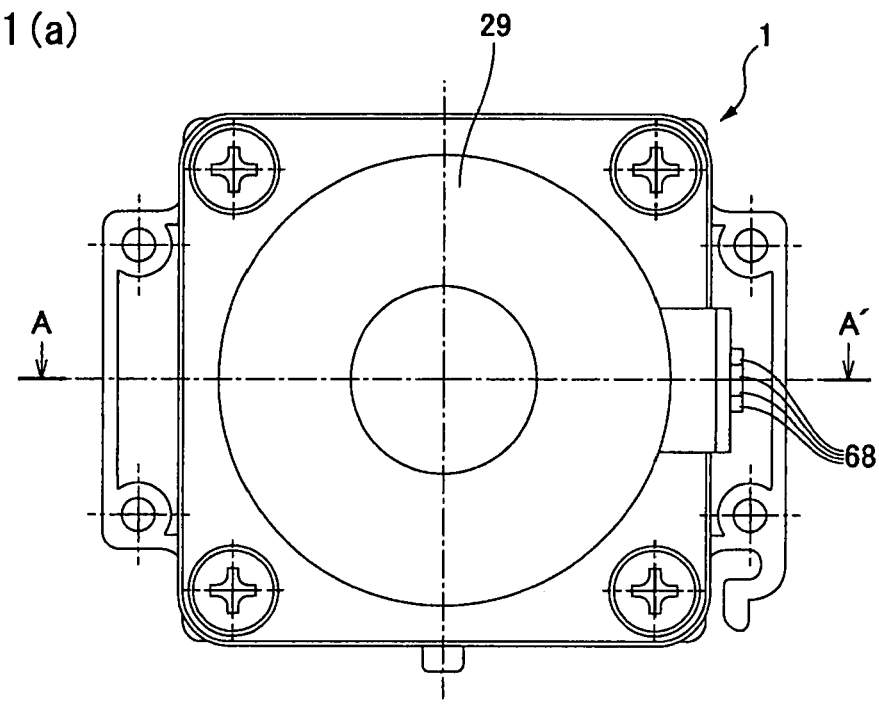
FIG. 1(a) is a plan view showing a hydraulic power generating device in accordance with an embodiment of the present invention.
Figure 1B:
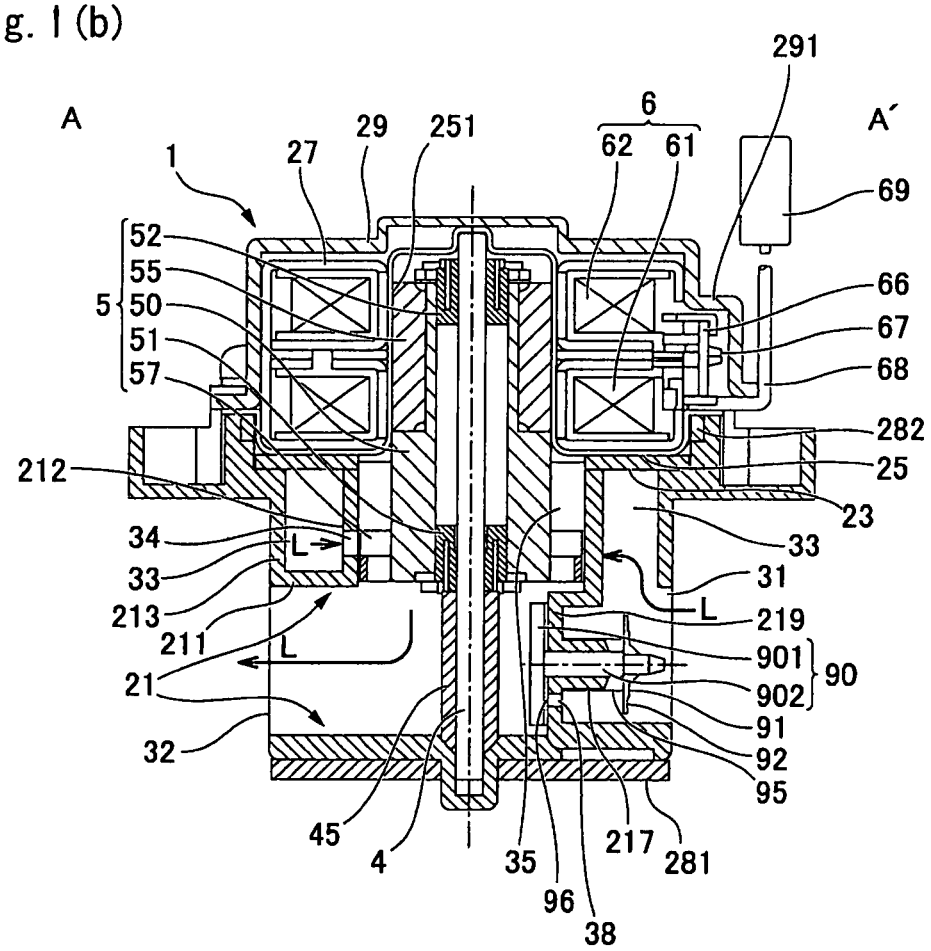
FIG. 1(b) is its A-A' cross-sectional view.

FIG. 1(a) is a plan view showing a hydraulic power generating device in accordance with an embodiment of the present invention, and FIG. 1(b) is its A-A' cross-sectional view. In FIG. 1(a), the line A-A' does not pass through a position of an ejection port, but an ejection port is illustrated on a left portion in FIG. 1(b).

A hydraulic power generating device 1 shown in FIGS. 1(a) and 1(b) is a small hydraulic power generating device which is disposed at a middle position of a flow path of tap water or the like. The hydraulic power generating device 1 is used in applications where, for example, electric power obtained by the hydraulic power generating device 1 is stored to supply the electric power to a sensor circuit or the like of an automatic faucet device. The hydraulic power generating device 1 in this embodiment includes a main body case 21 made of resin which structures a flow path as described below, a cover 23 which covers an upper face of the main body case 21, a cup-shaped partition plate 25 made of stainless steel which covers the cover 23, a ring-shaped case 27 which sandwiches a stator part 6 between a flange portion of the partition plate 25 and the case 27 itself, and an upper case 29 made of resin which covers over the ring-shaped case 27. The upper case 29 and the partition plate 25 are fixed to the main body case 21 with screws. A seal 281 made of EPDM is overlapped under a bottom face of the main body case 21 and an O-ring 282 made of rubber is disposed between the partition plate 25 and the main body case 21.

The main body case 21 is provided with a fluid inlet 31 and a fluid outlet 32 which are opened in side faces on opposite sides to each other. Water injection parts described below are structured with the main body case 21 and the cover 23 at a middle position of a flow path (shown by the arrow "L") from the fluid inlet 31 to the fluid outlet 32. A hydraulic turbine chamber 35 is structured between the main body case 21 and the partition plate 25. The hydraulic turbine chamber 35 is provided with a support shaft 4 whose lower end part and upper end part are respectively press-fitted and fixed to shaft fixing holes of the main body case 21 and the partition plate 25. A cylindrical power generating hydraulic turbine 5 is rotatably supported by the support shaft 4. A sleeve 45 made of resin is fitted to the support shaft 4 and the power generating hydraulic turbine 5 is supported on an upper portion of the support shaft 4 which is exposed from the sleeve 45. In accordance with this embodiment, the power generating hydraulic turbine 5 is prevented from moving up and down with washers or the like which are mounted on the support shaft 4.

A cylindrical permanent magnet 55 is fixed to an outer peripheral face of an upper half portion of the power generating hydraulic turbine 5 which is located within a cylindrical part 251 of the partition plate 25. Further, ring-shaped stator assemblies 61 and 62 are disposed on an outer peripheral face of the cylindrical part 251 of the partition plate 25, and a power generation part is structured with the permanent magnet 55 and the stator part 6.

The stator part 6 comprises two phases of stator assemblies 61 and 62 which are disposed to be superposed on each other in an axial direction. Each of two stator assemblies 61 and 62 is structured such that an outer stator core, a coil wound around a coil bobbin, and an inner stator core are superposed on each other. Pole teeth of the inner stator core and pole teeth of the outer stator core are alternately disposed along an inner periphery of the coil bobbin. Further, a winding start portion and a winding end portion of a coil are connected to a connector 69 through a terminal 67 of a terminal block 66 and a wire 68. In this embodiment, the upper case 29 is formed with a hood part 291 which covers the terminal block 66 to prevent water from entering into the stator part 6.

In the hydraulic power generating device 1 in this embodiment, the main body case 21 is formed with a partition wall 219 which faces the fluid inlet 31, and on an upward portion of the partition wall 219, a ring-shaped flow path 33 is formed around the hydraulic turbine chamber 35. In this embodiment, a bottom face, an inner peripheral face, an outer peripheral face and an upper face of the ring-shaped flow path 33 are respectively formed with a ring-shaped partition wall 211 of the main body case 21, a ring-shaped inner side vertical wall 212 of the main body case 21, a ring-shaped outer side vertical wall 213 of the main body case 21, and the cover 23.

The inner side vertical wall 212 is formed in a circumferential direction with a plurality of cutout portions, for example, four cutout portions. When the cover 23 is placed on an upper face of the main body case 21, four ejection ports 34 which eject water at a high speed to the blades 57 of the power generating hydraulic turbine 5 from the ring-shaped flow path 33 are structured by using four cutout portions.

The partition wall 219 is formed with an opening 38 for bypass for allowing water from the fluid inlet 31 to flow to the fluid outlet 32 without passing through the ring-shaped flow path 33. The opening 38 is closed by a slider 90 which is disposed on a rear face side of the partition wall 219. The partition wall 219 is formed with a cylindrical part 217 which is extended toward the fluid inlet 31. The slider 90 includes a plate-shaped valve part 901 which abuts with the rear face of the partition wall 219 through a seal 96 made of resin, a shaft part 902 which is extended from the valve part 901 through the cylindrical part 217, and a washer 92 which is fixed to a tip end portion of the shaft part 902 by a push nut 91. A coil spring 95 is disposed between an end part of the cylindrical part 217 and the washer 92. Therefore, when a pressure of water flowed from the fluid inlet 31 is low, since the valve part 901 of the slider 90 abuts with the partition wall 219 by an urging force of the coil spring 95, the opening 38 for bypass is closed. On the other hand, when a pressure of water flowed from the fluid inlet 31 is high and a water pressure larger than the urging force of the coil spring 95 is applied to the washer 92, the valve part 901 of the slider 90 is moved in a direction away from the partition wall 219 to open the opening 38 for bypass. Therefore, when the pressure of water flowed from the fluid inlet 31 is low, all of water is guided to the ring-shaped flow path 33 but, when the pressure of water from the fluid inlet 31 is high, a part of water directly flows to the fluid outlet 32 through the opening 38 for bypass without being guided to the ring-shaped flow path 33. Accordingly, even when a pressure of flowed water becomes excessively high, volume of water introduced into the hydraulic turbine chamber 35 through the ring-shaped flow path 33 is controlled and thus occurrence of rotation noise or the like can be prevented.

FIG. 2(a) is a perspective view showing a power generating hydraulic turbine which is used in the hydraulic power generating device shown in FIGS. 1(a) and 1(b), and which is viewed from a first radial bearing side. FIG. 2(b) is an explanatory plan view showing the power generating hydraulic turbine which is viewed from a second radial bearing side, and FIG. 2(c) is its B-B' cross-sectional view.

As shown in FIGS. 2(a), 2(b) and 2(c), in the hydraulic power generating device 1 in accordance with this embodiment, the power generating hydraulic turbine 5 includes a hollow cylindrical body 50, a plurality of blades 57 which is projected from an outer peripheral face of the hollow cylindrical body 50 with an equal angular interval, a first cylindrical radial bearing 51 which is positioned at a first end part of a through hole 501 of the hollow cylindrical body 50 (lower side where the main body case 21 is disposed), and a second cylindrical radial bearing 52 which is positioned at the other end part, i.e., a second end part of the through hole 501 (upper side where the cylindrical part 251 of the partition plate 25 is disposed). The support shaft 4 shown in FIG. 1(b) is fitted into a shaft hole 510 of the first radial bearing 51 and into a shaft hole 520 of the second radial bearing 52 and, as a result, the power generating hydraulic turbine 5 is supported rotatably around the support shaft 4. The lower end portion of the hollow cylindrical body 50 where the blades 57 are formed is formed with a larger diameter and its upper half portion is formed with a small diameter. A cylindrical permanent magnet 55 is fixed to the small diameter portion of the hollow cylindrical body 50.

In this embodiment, each of a plurality of blades 57 of the power generating hydraulic turbine 5 is structured to be divided into a first blade 571 which is positioned on the second radial bearing 52 side in an axial direction and a second blade 572 which is positioned on the first radial bearing 51 side. Respective outer peripheral ends of the second blades 572 are connected with each other through a cylindrical plate part 58 which is formed parallel to the axial direction of the hollow cylindrical body 50. An outer face of the cylindrical plate part 58 is positioned at the same distance in a radial direction as the outer tip ends of the first blades 571.

In the power generating hydraulic turbine 5 structured as described above, as shown in FIG. 2(b), four ejection ports 34 are formed around the power generating hydraulic turbine 5 with an equal angular interval. Four ejection ports 34 are opened toward a direction facing both of the first blade 571 and the cylindrical plate part 58 and, as shown by the arrows "L1" and "L2" in FIG. 2(c), each of the ejection ports 34 is structured to eject water to both the first blade 571 and the cylindrical plate part 58. In other words, a part of the water ejected from the ejection port 34 directly hits the first blade 571 as shown by the arrow "L1", and a remaining part of the water ejected from the ejection port 34 hits the outer peripheral face of the cylindrical plate part 58 as shown by the arrow "L2".

In this embodiment, the number of the ejection ports 34 formed in the water injection part and the number of the blades 57 are in relation prime to each other and thus they are set to be a condition that one is not equal to an integer multiple of the other. For example, in this embodiment, the number of the blades 57 is seven (7) while the number of the ejection ports 34 is four (4).

In this embodiment, each of the first radial bearing 51 and the second radial bearing 52 is a resin molded product which is formed to be separated from the hollow cylindrical body 50. The first radial bearing 51 is press-fitted to a first end part of the through hole 501 and then welded to the hollow cylindrical body 50 to be fixed to the through hole 501. In this case, a clearance between an inner peripheral face of the first end part of the through hole 501 and an outer peripheral face of the first radial bearing 51 is set to be smaller, for example, in a range from about 0.00 mm to about 0.03 mm. On the other hand, as described below, the second radial bearing 52 is inserted into the through hole 501 under a condition that the first radial bearing 51 has been positioned in the radial direction with the shaft hole 510 of the first radial bearing 51 as the reference and then the second radial bearing 52 is welded to the hollow cylindrical body 50. Therefore, since the second radial bearing 52 is positioned in the radial direction with the shaft hole 510 of the first radial bearing 51 as the reference, a clearance between an inner peripheral face in a second end part of the through hole 501 and an outer peripheral face of the second radial bearing 52 is set to be larger, for example, in a range from about 0.04 mm to about 0.07 mm so as to be capable of performing positional adjustment of the second radial bearing 52 in the radial direction in the through hole 501.

Next, an assembling method of the power generating hydraulic turbine 5 in a manufacturing method of the hydraulic power generating device 1 in accordance with an embodiment will be described below with reference to FIGS. 1(a), 1(b), FIGS. 2(a) through 2(c), and FIGS. 3(a) through 3(d), and the structure of the power generating hydraulic turbine 5 will be described in detail below.

Figure 3A:
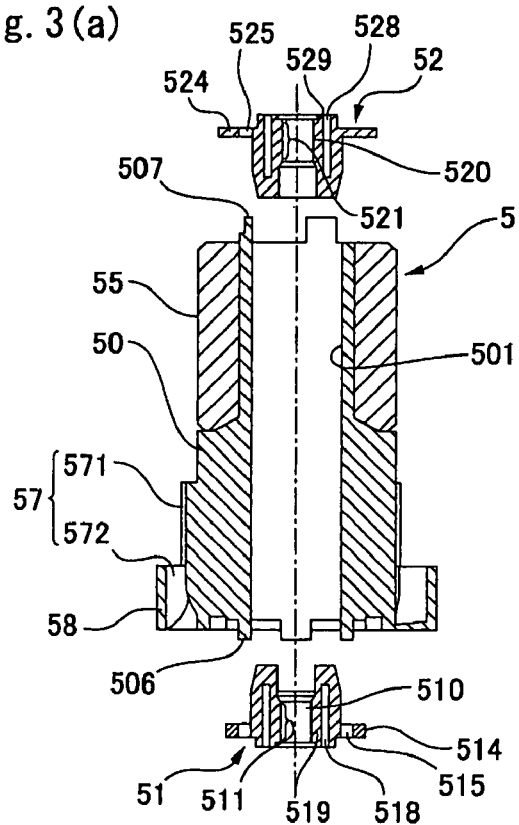
FIGS. 3(a) through 3(d) are cross-sectional views showing steps of assembling method of the power generating hydraulic turbine shown in FIG. 2(a) through 2(c).

FIGS. 3(a) through 3(d) are cross-sectional views showing steps of the assembling method of the power generating hydraulic turbine shown in FIGS. 2(a) through 2(c). First, as shown in FIG. 3(a), a bottom face of the hollow cylindrical body 50 is formed with four plate-shaped protruded parts 506 for welding and these protruded parts 506 for welding are formed along an inner circumferential edge of the through hole 501 with an equal angular interval. The first radial bearing 51 is provided with a disk-shaped flange part 514, which is formed at a lower end portion of the first radial bearing 51 so as to have a larger diameter, and four holes 515 into which the protruded parts 506 for welding of the hollow cylindrical body are fitted are formed at a root portion of the flange part 514. Further, a circumferential groove 518 which recesses in the axial direction is formed at a bottom end face of the first radial bearing 51 on an inner peripheral side of the holes 515 so as to surround the shaft hole 510 and a thin cylindrical wall 519 is formed between the shaft hole 510 and the circumferential groove 518. An inner diameter of the shaft hole 510 is changed in the axial direction and the shaft hole 510 is provided with a small inner diameter portion and a large inner diameter portion. The small inner diameter portion is a slide portion 511 of the first radial bearing 51 with the support shaft 4 and thus the circumferential groove 518 is formed in such a depth that the entire slide portion 511 is structured to be the thin cylindrical wall 519.

Three plate-shaped protruded parts 507 for welding are formed on an upper face of the hollow cylindrical body 50. These protruded parts 507 for welding are formed along an inner circumferential edge of the through hole 501 with an equal angular interval. On the other hand, the second radial bearing 52 is provided with a disk-shaped flange part 524 which is formed at an upper end portion of the second radial bearing 52 in a larger diameter, and four holes 525 into which the protruded parts 507 for welding of the hollow cylindrical body are fitted are formed at a root portion of the flange part 524. Further, a circumferential groove 528 which recesses in the axial direction is formed at an upper end face of the second radial bearing 52 on an inner peripheral side of the holes 525 so as to surround the shaft hole 520 and a thin cylindrical wall 529 is formed between the shaft hole 520 and the circumferential groove 528. An inner diameter of the shaft hole 520 is changed in the axial direction and the shaft hole 520 is provided with a small inner diameter portion and a large inner diameter portion. The small inner diameter portion is a slide portion 521 of the second radial bearing 52 with the support shaft 4 and thus the circumferential groove 528 is formed in such a depth that the entire slide portion 521 is structured to be the thin cylindrical wall 529.

Figure 3B:
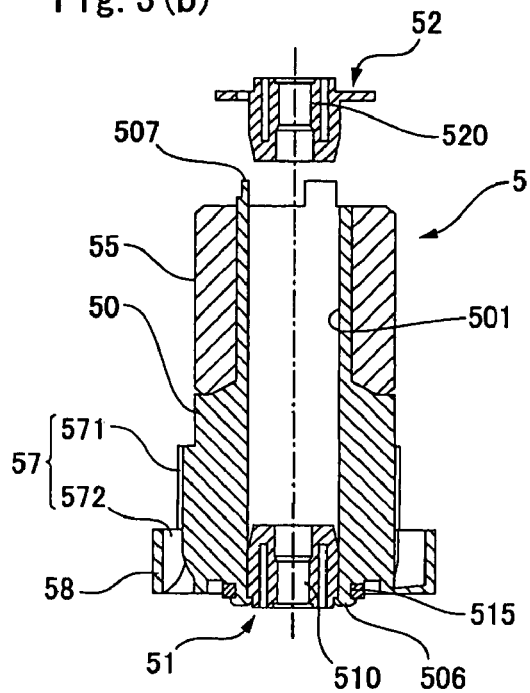

When the power generating hydraulic turbine 5 is going to be assembled by using the hollow cylindrical body 50, the first radial bearing 51 and the second radial bearing 52 which are described above, first, a fixing step of the first radial bearing shown in FIG. 3(b) is performed. In other words, the first radial bearing 51 is press-fitted into the first end part of the through hole 501 so that the protruded parts 506 for welding formed on the bottom end face of the hollow cylindrical body 50 are fitted into the holes 515 of the first radial bearing 51. After that, tip end portions of the protruded parts 506 for welding which are protruded out from the holes 515 are heated and melted to fix the first radial bearing 51 to the first end part of the through hole 501 by welding.

Figure 3C:
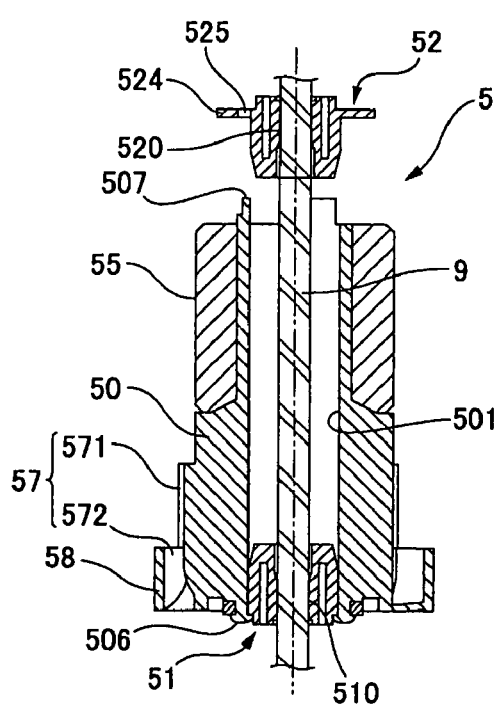
Figure 3D:
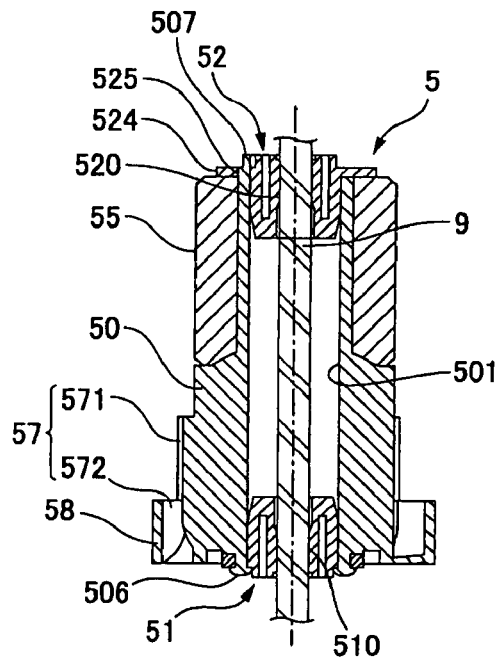

Next, a centering step is performed as shown in FIG. 3(c). In the centering step, a positioning shaft 9 is fitted into the shaft hole 510 of the first radial bearing 51 which is fixed to the first end part of the through hole 501. After that, the positioning shaft 9 is fitted into the shaft hole 520 of the second radial bearing 52 and then, as shown in FIG. 3(d), the second radial bearing 52 is inserted into the second end part of the through hole 501. In this case, the protruded parts 507 for welding which are formed on the upper end face of the hollow cylindrical body 50 are fitted into the holes 525 which are formed in the flange part 524 of the second radial bearing 52. In accordance with this embodiment, the clearance between the inner peripheral face of the through hole 501 and the outer peripheral face of the second radial bearing 52 is set to be larger, for example, in a range from about 0.04 mm to 0.07 mm and thus, when the second radial bearing 52 is going to be positioned in the radial direction with the shaft hole 510 of the first radial bearing 51 as the reference, positional adjustment of the second radial bearing 52 can be performed in the radial direction within the through hole 501. In accordance with this embodiment, a sufficient clearance is set between the hole 525 and the protruded part 507 for welding.

Next, a fixing step of the second radial bearing is performed. In this fixing step, tip end portions of the protruded parts 507 for welding which are protruded out from the holes 525 are heated and melted to fix the second radial bearing 51 to the second end part of the through hole 501 by welding. The second radial bearing 52 which is fixed to the hollow cylindrical body 50 as described above also functions to prevent the permanent magnet 55 from falling from the hollow cylindrical body 50.

After that, the positioning shaft 9 is pulled out from the power generating hydraulic turbine 5. When the hydraulic power generating device 1 is assembled, the power generating hydraulic turbine 5 as structured above is disposed in the hydraulic turbine chamber 35 in a state that the support shaft 4 is fitted into the shaft hole 510 of the first radial bearing 51 and fitted into the shaft hole 520 of the second radial bearing 52.

In the hydraulic power generating device 1 structured as described above, water flowed from the fluid inlet 31 hits the partition wall 219 to be flowed into the upper ring-shaped flow path 33 and then ejected to the blades 57 of the power generating hydraulic turbine 5 from four ejection ports 34. As a result, since the power generating hydraulic turbine 5 is rotated, the permanent magnet 55 is also rotated and thus an induced voltage is generated in a coil of the stator part 6. The water which has been used to rotate the power generating hydraulic turbine 5 is flowed downward and ejected through the fluid outlet 32. Further, an induced voltage generated in the stator part 6 is connected to an external circuit through a connector 69 where the induced voltage is converted into a direct current by the circuit and then rectified to be charged in a battery.

As described above, the power generating hydraulic turbine 5 used in the hydraulic power generating device 1 in accordance with this embodiment is provided with the cylindrical plate part 58 which is located to be adjacent in the axial direction to the first blade 571, and the cylindrical plate part 58 functions as a vibration preventing wall. In other words, four ejection ports 34 are opened toward a direction facing both of the first blade 571 and the cylindrical plate part 58. Therefore, parts of the waters ejected from the ejection ports 34 directly hit the first blades 571, but remaining parts of the waters ejected from the ejection ports 34 hit the outer peripheral face of the cylindrical plate part 58 from different directions all the time. Accordingly, pressures of the waters which hit the cylindrical plate part 58 from different directions provide a centering operation to the power generating hydraulic turbine 5 and thus occurrence of rotational vibration and rotation noise can be prevented when the power generating hydraulic turbine 5 is rotated.

Further, after the water has directly hit the first blade 571, the water subsequently hits the second blade 572 efficiently when it passes through the inside of the cylindrical plate part 58 and thus the power generating hydraulic turbine 5 is rotated efficiently. Moreover, the radial distance of the outer face of the cylindrical plate part 58 is set to be the same as that of the outer tip end of the first blade 571. Therefore, since the water which has directly hit the first blade 571 can be efficiently guided to the inside of the cylindrical plate part 58, the water after having hit the first blade 571 is efficiently supplied to the second blade 572 and thus the power generating hydraulic turbine 5 is rotated efficiently. As a result, according to this embodiment, the hydraulic power generating device 1 with a high degree of power generation efficiency can be obtained.

Further, in this embodiment, a plurality of ejection ports 34 and a plurality of blades 57 are formed with respective equal angular intervals and thus stable power generation can be performed. In addition, in this embodiment, four ejection ports 34 are formed with an equal angular interval and seven blades 57 are formed with an equal angular interval, that is, the number of the ejection ports 34 and the number of the blades 57 are set in a relation prime to each other. In other words, the number of the ejection ports 34 and the number of the blades 57 are set to be a condition that one is not equal to an integer multiple of the other. Therefore, the waters which are ejected from the ejection ports 34 are prevented from hitting simultaneously two or more blades 57 intensely and thus large forces are prevented from being applied simultaneously to the power generating hydraulic turbine 5. Accordingly, rotational vibration and rotation noise which occur when the power generating hydraulic turbine 5 is rotated can be surely prevented. On the contrary, when the number of the ejection ports 34 and the number of the blades 57 are set to be a condition that one is equal to an integer multiple of the other, the waters ejected from the ejection ports 34 may hit a plurality of blades 57 simultaneously and intensely. Therefore, large forces are simultaneously applied to the power generating hydraulic turbine 5 and thus rotational vibration and rotation noise may occur easily. However, according to the embodiment of the present invention, timings when four first blades 571 respectively approach to the closest position to the ejection-ports 34 are different from each other, and thus rotational vibration and rotation noise as described above can be prevented.

Further, the power generating hydraulic turbine 5 of the hydraulic power generating device 1 in accordance with the embodiment is so structured that the hollow cylindrical body 50 which is provided with the blades 57 projected from its outer peripheral face, the first radial bearing 51 and the second radial bearing 52 are formed to be separated from each other. Therefore, even when the hollow cylindrical body 50, the first radial bearing 51 and the second radial bearing 52 are respectively structured of a resin molded product, shrinkage or the like is not easily occurred. Accordingly, the first radial bearing 51 and the second radial bearing 52 can be manufactured by resin molding so that both their shaft holes 510 and 520 are formed in the same size with a high degree of dimensional accuracy. Further, after the first radial bearing 51 has been fixed to the hollow cylindrical body 50, the second radial bearing 52 is positioned with the shaft hole 510 of the first radial bearing 51 as the reference and thus the first radial bearing 51 and the second radial bearing 52 can be arranged at a concentric position. Accordingly, rotational vibration and rotation noise which occur when the power generating hydraulic turbine 5 is rotated can be surely prevented.

Further, the hollow cylindrical body 50 is structured in a separated manner from the first radial bearing 51 and the second radial bearing 52. Therefore, the first radial bearing 51 and the second radial bearing 52 may be formed of abrasion resistance material such as polyacetal resin containing carbon fiber, and the hollow cylindrical body 50 may be formed of inexpensive resin material such as polyphenylene ether or resin material suitable for reducing weight. Accordingly, even when the radial bearings 51 and 52 are structured of abrasion resistance material, manufacturing cost can be restrained.

Further, the first radial bearing 51 and the second radial bearing 52 are formed with the circumferential grooves 518 and 528 which are recessed in the axial direction so as to surround the shaft holes 510 and 520, and the thin cylindrical walls 519 and 529 are formed between the shaft holes 510, 520 and the circumferential grooves 518, 528. Moreover, the entire slide portions 511 and 521 of the shaft holes 510 and 520 on the support shaft 4 are structured of the thin cylindrical walls 519 and 529. Therefore, when the first radial bearing 51 and the second radial bearing 52 are produced by resin molding, shrinkage in the slide portions 511 and 521 can be prevented. Accordingly, in the first radial bearing 51 and the second radial bearing 52, dimensions of diameter of the slide portions 511 and 521 of the shaft holes 510 and 520 can be formed with a high degree of accuracy. Further, when the first radial bearing 51 is press-fitted into the through hole 501 of the hollow cylindrical body 50, deformation of the thin cylindrical wall 519 is absorbed by the circumferential groove 518 and thus dimension of an inner diameter of the shaft hole 510 is not affected. In addition, even when deformation is occurred when the first radial bearing 51 and the second radial bearing 52 are welded to the through hole 501 of the hollow cylindrical body 50, the deformation can be absorbed by the circumferential grooves 518 and 528. Therefore, dimensions of inner diameters of the shaft holes 510 and 520 are not affected.

Further, the clearance between the inner peripheral face of the through hole 501 and the outer peripheral face of the second radial bearing 52 is larger than that between the inner peripheral face of the through hole 501 and the outer peripheral face of the first radial bearing 51. Therefore, the first radial bearing 51 can be press-fitted into the first end part of the through hole 501 and thus, when the second radial bearing 52 is going to be positioned with the shaft hole 510 of the first radial bearing 51 as the reference, a problem can be prevented where the second radial bearing 52 abuts with the inner peripheral face of the second end part of the through hole 501 and thus hinders centering.

In addition, in the centering step when the power generating hydraulic turbine 5 is assembled, after the positioning shaft 9 has been fitted into the shaft hole 510 of the first radial bearing 51 which had been fixed to the first end part of the through hole 501, the positioning shaft 9 is fitted into the shaft hole 520 of the second radial bearing 52 to perform positioning of the second radial bearing 52. Therefore, the second radial bearing 52 can be easily and surely positioned with the shaft hole 510 of the first radial bearing 51 as the reference.

In the embodiment described above, when the power generating hydraulic turbine 5 is assembled, the first radial bearing 51 and the second radial bearing 52 are fixed to the hollow cylindrical body 50 by welding, but methods such as mechanical pressing or squashing, or adhesion may be utilized. Further, in the embodiment described above, the power generating hydraulic turbine 5 is used in which the first radial bearing 51 and the second radial bearing 52 are structured in a separated manner. However, the power generating hydraulic turbine 5 may be used in which the first radial bearing 51 and the second radial bearing 52 are structured with the hollow cylindrical body 50 in an integral molded manner. In addition, in the embodiment described above, four ejection ports 34 are formed with an equal angular interval. However, four ejection ports 34 may be formed with not-equal angular intervals to cause timings of four first blades 571 which are respectively approached to the closest position to the ejection ports 34 to be different from each other. Further, in the embodiment described above, the number of the ejection ports 34 and the number of the blades 57 are in a relation prime to each other, that is, they are set to be a condition that one is not equal to an integer times of the other. However, the present invention may be applied to a case where they are set to be a condition that one is set to be an integer times of the other.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A hydraulic power generating device comprising:
    a flow path which is formed from a fluid inlet to a fluid outlet;
    a power generating hydraulic turbine which is disposed at a middle position of the flow path in an axially rotatable manner; and
    at least one ejection port which ejects water to the power generating hydraulic turbine;
    wherein the power generating hydraulic turbine comprises:
        a plurality of first blades which is projected on an outer peripheral side; and
        a cylindrical plate part which is coaxially structured with a rotating center axial line of the power generating hydraulic turbine at a position adjacent in an axial direction to the first blades; and
    the ejection port is opened both to the plurality of first blades and to the cylindrical plate part of the power generating hydraulic turbine; and
    the ejection port is structured so as to eject water to hit both the plurality of first blades and an outer face of the cylindrical plate part, thereby performing a centering operation to the power generating hydraulic turbine by the pressure of the water that hits the cylindrical plate part.

2. The hydraulic power generating device according to claim 1, wherein
    the power generating hydraulic turbine comprises a plurality of second blades which is projected on the outer peripheral side and which is disposed adjacent to the plurality of first blades in the axial direction, and
    the cylindrical plate part connects outer tip ends of the second blades with each other.

3. The hydraulic power generating device according to claim 2, wherein a radial distance of an outer peripheral face of the cylindrical plate part is the same as a radial distance of an outer tip end of the first blade.

4. The hydraulic power generating device according to claim 1, wherein the at least one ejection port comprises a plurality of ejection ports and timings of the first blades which are respectively approached to a closest position to the ejection ports are different from each other.

5. The hydraulic power generating device according to claim 4, wherein
    the plurality of first blades is disposed with an equal angular interval and the plurality of ejection ports is formed with an equal angular interval, and
    a number of the plurality of first blades and a number of the plurality of ejection ports are set in a relation prime to each other.

* * * * *